United States Patent
Washio

(10) Patent No.: US 9,031,841 B2
(45) Date of Patent: May 12, 2015

(54) SPEECH RECOGNITION APPARATUS, SPEECH RECOGNITION METHOD, AND SPEECH RECOGNITION PROGRAM

(71) Applicant: Fujitsu Limited, Kawasaki-shi, Kanagawa (JP)

(72) Inventor: Nobuyuki Washio, Akashi (JP)

(73) Assignee: Fujitsu Limited, Kawasaki (JP)

( * ) Notice: Subject to any disclaimer, the term of this patent is extended or adjusted under 35 U.S.C. 154(b) by 342 days.

(21) Appl. No.: 13/711,988

(22) Filed: Dec. 12, 2012

(65) Prior Publication Data

US 2013/0173267 A1   Jul. 4, 2013

(30) Foreign Application Priority Data

Dec. 28, 2011   (JP) .................................. 2011-290023

(51) Int. Cl.
*G10L 15/197* (2013.01)
*G10L 15/22* (2006.01)

(52) U.S. Cl.
CPC .............. *G10L 15/22* (2013.01); *G10L 15/197* (2013.01)

(58) Field of Classification Search
USPC .................... 704/251–257, 271, 275
See application file for complete search history.

(56) References Cited

U.S. PATENT DOCUMENTS

| | | | |
|---|---|---|---|
| 6,556,970 B1* | 4/2003 | Sasaki et al. ................... | 704/257 |
| 2002/0010587 A1* | 1/2002 | Pertrushin ..................... | 704/275 |
| 2005/0143998 A1* | 6/2005 | Ogawa .......................... | 704/251 |
| 2010/0191524 A1 | 7/2010 | Washio et al. | |
| 2010/0324897 A1 | 12/2010 | Emori et al. | |
| 2011/0246190 A1* | 10/2011 | Suzuki et al. ................. | 704/226 |

FOREIGN PATENT DOCUMENTS

| | | |
|---|---|---|
| JP | 07-092989 | 4/1995 |
| JP | 2010-266522 | 11/2010 |
| WO | WO 2008/069308 | 6/2008 |
| WO | WO 2009/078093 | 6/2009 |

* cited by examiner

*Primary Examiner* — Abul Azad
(74) *Attorney, Agent, or Firm* — Staas & Halsey LLP

(57) ABSTRACT

A apparatus includes: a storage unit to store a model representing a relationship between a relative time and an occurrence probabilities; a first detection unit to detect first speech period of a first speaker; a second period detection unit to detect second speech period of a second speaker; a unit to calculate a feature value of the first speech period; a detection unit to detect a word using the calculated feature value; an adjustment unit to make an adjustment such that in detecting a word for a reply by the detection unit, the adjustment unit retrieves an occurrence probability corresponding to a relative position of the reply in the second speech period, and adjusts a word score or a detection threshold value for the reply; and a second detection unit to re-detect, using the adjusted word score or the adjusted detection threshold value, the detected word by the detection unit.

6 Claims, 14 Drawing Sheets

FIG. 8

| TECHNIQUE | DETECTION THRESHOLD VALUE | CORRECT DETECTION | INCORRECT DETECTION |
|---|---|---|---|
| CONVENTIONAL | 80 | 501 | 6 |
|  | 78 | 532 | 8 |
|  | 77 | 548 | 9 |
| EMBODIMENT | 75 TO 80 | 523 | 6 |
|  | 70 TO 80 | 545 | 8 |

FIG. 9

| TECHNIQUE | DETECTION THRESHOLD VALUE | CORRECT DETECTION | INCORRECT DETECTION |
|---|---|---|---|
| CONVENTIONAL | 80 | 501 | 6 |
|  | 81 | 495 | 5 |
| EMBODIMENT | 75 TO 81 | 515 | 5 |

SPEECH RECOGNITION APPARATUS, SPEECH RECOGNITION METHOD, AND SPEECH RECOGNITION PROGRAM

CROSS-REFERENCE TO RELATED APPLICATION(S)

This application is based upon and claims the benefit of priority of the prior Japanese Patent Application No. 2011-290023, filed on Dec. 28, 2011, the entire contents of which are incorporated herein by reference.

FIELD

The embodiments discussed herein are related to a speech recognition apparatus, a speech recognition method, and a speech recognition program.

BACKGROUND

In an aspect, speech recognition technology is used to detect a word registered in a dictionary from an input voice. This technique is known as word spotting. In the word spotting, one or more words used in searching are stored in advance in the dictionary, and only registered words are extracted from the input voice. Thus, the word spotting technique may be used in voice information search. However, even the same word may be different in pronunciation, i.e., a waveform of pronounced word may be different depending on speakers or even from one utterance to another by the same speaker. This may cause an error in recognition, which does not occur in recognition of written text.

In addition to the word spotting, the speech recognition technology is also used to recognize a voice in a dialogue. For example, a speech recognition method is known which learns an acoustic model and a language model in accordance with the length of a speech period or a time elapsed since the start or the end of the speech period thereby to enhance accuracy in recognizing voices with feature values difficult to accurately distinguish as in spoken words in a dialogue. Another example is a state-based dialogue division apparatus configured to divide voice data of a dialogue between two persons into a plurality of pieces depending on states thereof thereby to achieve an improvement in accuracy of a data mining result.

More specifically, the state-based dialogue division apparatus detects speech periods of respective speakers from voice data and compares the ratio of time between the speech periods of two speakers with at least two threshold values. In accordance with the result of the comparison with the threshold values, the state-based dialogue division apparatus divides the dialogue data into a plurality of pieces according to states such as a state in which one speaker is talking about a certain subject, a state in which another speaker answers, etc.

Descriptions of techniques associated with the speech recognition technology may be found, for example, in International Publication Pamphlet No. WO/2008/069308, Japanese Laid-open Patent Publication No. 2010-266522, etc.

However, the techniques described above have a problem that it is difficult to accurately detect a reply uttered by a speaker in response to an utterance of another speaker, as described below.

That is, a reply uttered by a speaker in response to an utterance of another speaker is short in length as is the case with, for example, "yes", "no", or the like, and includes a less amount of information than other utterances. Therefore, even when the speech recognition method or the state-based dialogue division apparatus described above is used, there is a limit on the accuracy in detecting replies. It may be possible to increase the probability of replies being detected by reducing the detection threshold value that is compared with the score calculated for the input voice. However, this may cause noise or other words to be incorrectly recognized as replies, which results in a reduction in accuracy in detecting replies.

Another problem with the conventional techniques described above is that when a word is uttered, if there is another word that has the same pronunciation but that has a different meaning, there is a possibility that the word is erroneously detected as a reply. That is, for example, when "yes" is uttered, there are two possibilities, i.e., a first possibility is that "yes" is uttered by a speaker as a reply in response to a speech of another speaker, and a second possibility is that yes" is used to call attention rather than to respond to a speech of another speaker as in an example "Yes, it is now time." In such a case, it may be difficult to detect whether an utterance is a reply or not.

Furthermore, in the speech recognition method described above, it is assumed that there is only one speaker, and no consideration is made as to whether a voice being recognized is of a dialogue or not. That is, it is difficult to determine whether the voice is of a dialogue or not. On the other hand, in the state-based dialogue division apparatus described above, the state of the dialogue is estimated based on the utterance period length. However, there is no correlation between the utterance period length and the content of the utterance in terms of whether the content includes a word used as a reply, and thus it is difficult to detect only a reply uttered in response to a speech.

SUMMARY

According to an aspect of the invention, an apparatus includes: a storage unit to store a model representing a relationship between a relative time and an occurrence probabilities; a first detection unit to detect speech periods of a first speaker; a second period detection unit to detect speech periods of a second speaker; a unit to calculate feature values of the detected first speaker's speech period; a detection unit to detect a word using the calculated feature value; an adjustment unit to make an adjustment such that in detecting a word for a reply by the detection unit, the adjustment unit retrieves an occurrence probability corresponding to a relative position of the reply in the second speech period, and adjusts a word score or a detection threshold value for the reply; and a second detection unit to re-detect, using the adjusted word score or the adjusted detection threshold value, the detected word by the detection unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an advantageous effect of the first embodiment;

FIG. 9 is a diagram illustrating an advantageous effect of the first embodiment;

DESCRIPTION OF EMBODIMENTS

Embodiments of a speech recognition apparatus, a speech recognition method, and a speech recognition program are described in detail below with reference to drawings. Note that the embodiments described below are for illustrating examples but not for limitation. Note that the embodiments may be properly combined as long as no contradiction occurs.

First Embodiment

Speech Recognition Apparatus

Figure 1:
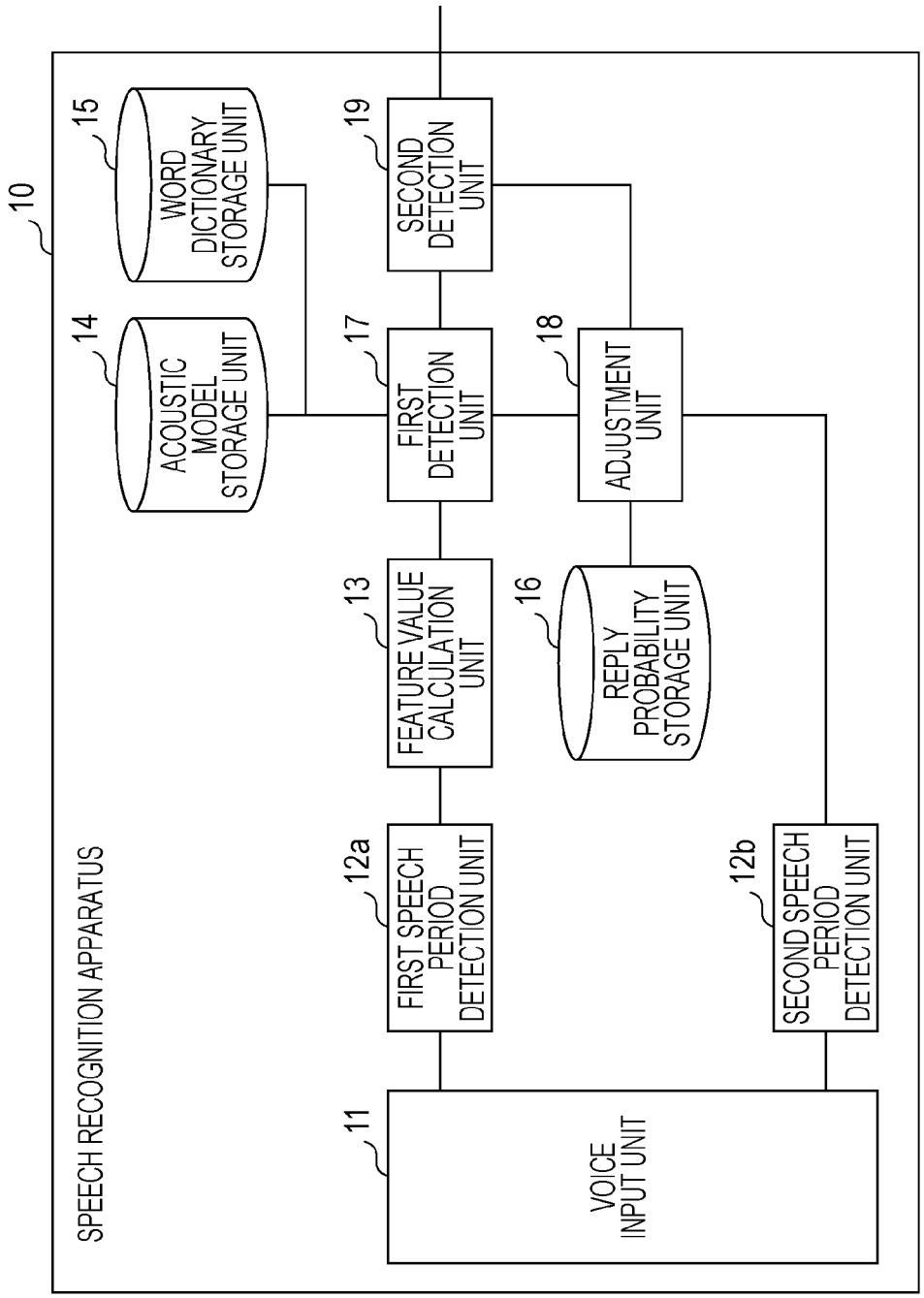
FIG. 1 is a block diagram illustrating a functional configuration of a speech recognition apparatus according to a first embodiment.

FIG. 1 is a block diagram illustrating a functional configuration of a speech recognition apparatus according to a first embodiment. The speech recognition apparatus 10 illustrated in FIG. 1 is configured to analyze voices uttered by a speaker A and a speaker B and detect a reply uttered by the speaker A in response to an utterance of the speaker B. Hereinafter, a reply uttered by the speaker A in response to an utterance of the speaker B will also be referred to simply as a reply.

As illustrated in FIG. 1, the speech recognition apparatus 10 includes a voice input unit 11, a first speech period detection unit 12a, a second speech period detection unit 12b, a feature value calculation unit 13, an acoustic model storage unit 14, a word dictionary storage unit 15, and a reply probability storage unit 16. The speech recognition apparatus 10 further includes a first detection unit 17, an adjustment unit 18, and a second detection unit 19. Note that the speech recognition apparatus 10 may include other functional units such as an input device, a communication interface, etc., which are usually disposed in a computer, in addition to those illustrated in FIG. 1.

The voice input unit 11 is a processing unit configured to input voice data to the first speech period detection unit 12a and the second speech period detection unit 12b. More specifically, for example, the voice input unit 11 shifts the voice data of the speaker A and the speaker B repeatedly by a predetermined amount, for example, 24 msec, and divides the voice data into a plurality of frames each having a predetermined frame width, for example, 32 msec. Thereafter, the voice input unit 11 inputs voice frames of the speaker A to the first speech period detection unit 12a and voice frames of the speaker B to the second speech period detection unit 12b.

The voice data used may be acquired via an arbitrary path. For example, in a case where the speech recognition apparatus 10 is implemented in a communication apparatus such as a portable telephone apparatus, a PHS (Personal Handyphone System) device, or the like, voice data of the speaker A and voice data of the speaker B may be acquired, for example, via a following path. That is, the voice input unit 11 may use voice data acquired via a microphone of the communication apparatus as voice data of the speaker A, and incoming voice data received by the communication apparatus as voice data of the speaker B.

In a case where the speech recognition apparatus 10 is disposed in an information processing apparatus such as a personal computer, voice data of the speaker A and voice data of the speaker B may be acquired via a following path. That is, the voice input unit 11 may use, as voice data of the speaker A, voice data acquired via a microphone disposed in or connected to an information processing apparatus. In another example, as for voice data of the speaker B, the voice input unit 11 may employ voice data output as a voice guide by an OS (Operating System) or an application installed on the information processing apparatus. In this case, by detecting a reply of the speaker A in response to an utterance of the speaker B, it is possible to detect, for example, whether a system or an application is capable of performing a command corresponding to a process guided by the system or the application.

Alternatively, the voice data may be acquired by reading from an external storage device such as a hard disk, a memory card, an USB (Universal Serial Bus) memory, or the like in which the voice data has been stored, or may be acquired via a network.

The first speech period detection unit 12a is a processing unit that detects a period during which the speaker A is uttering from voice frames of the speaker A input via the voice input unit 11. Hereinafter, such a period will be referred to simply as a speech period. More specifically, for example, the first speech period detection unit 12a periodically estimates the background noise power Pn based on the input power P in each voice frame and detects a period in which the input power is greater than the sum of the background noise power Pn and a predetermined threshold value $\alpha$. When such a period is detected, the detected period is regarded as a speech period.

More specifically, in a case where a voice frame input from the voice input unit 11 is a first frame, the first speech period detection unit 12a performs initialization such that background noise power Pn is set to be equal to input power P. On the other hand, in a case where the voice frame input from the voice input unit 11 is not the first frame, the first speech period detection unit 12a determines whether starting of a speech period has already been detected. If starting of a speech period has not yet been detected, then the first speech period detection unit 12a determines whether input power P of the voice frame is greater than the sum of the background noise power Pn and a threshold value $\alpha$, i.e., $P > Pn + \alpha$.

In a case where the input power P of the voice frame is greater than the sum of the background noise power Pn and the threshold value α, it is determined that the speaker A is likely to be uttering. Thus, the first speech period detection unit 12a determines that the speech period started at the time at which the above-described sum was exceeded, and the first speech period detection unit 12a stores the detected start position in an internal memory (not illustrated). On the other hand, in a case where the input power P of the voice frame is smaller than the sum of the background noise power Pn and the threshold value α, the first speech period detection unit 12a updates the background noise power Pn stored in the internal memory (not illustrated) to the input power P. That is, when the speaker A is determined to be not likely to be uttering, the background noise power Pn is updated in response to a change in noise.

On the other hand, in a case where starting of a speech period has already been detected, the first speech period detection unit 12a determines whether the input power P of the voice frame has become smaller than the sum of the background noise power Pn and the threshold value α, i.e., P<Pn+α.

If the input power P of the voice frame has become smaller than the sum of the background noise power Pn and the threshold value α, it is assumed that the utterance of the speaker A is ended. Thus, the first speech period detection unit 12a regards, as the end position of the speech period, the time at which the above-described sum was crossed downward, and the first speech period detection unit 12a outputs the speech period of the speaker A defined as from the start position stored in the internal memory to the detected end position. Thereafter, the first speech period detection unit 12a updates the background noise power Pn stored in the internal memory (not illustrated) to the input power P.

On the other hand, in a case where the input power P of the voice frame is greater than or equal to the sum of the background noise power Pn and the threshold value α, the utterance of the speaker A is regarded as continuing. In this case, the first speech period detection unit 12a postpones the determination as to the end position of the speech period.

Figure 2:
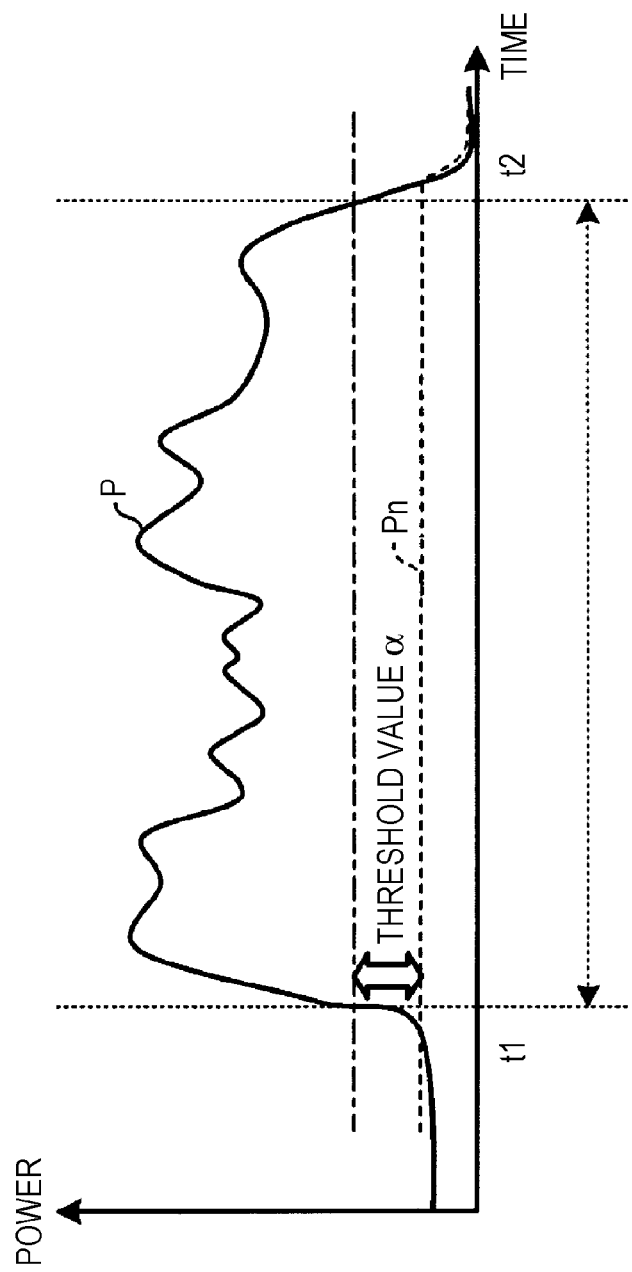
FIG. 2 is a diagram illustrating a method of detecting a speech period.

FIG. 2 is a graph illustrating a method of detecting a speech period. In the graph illustrated in FIG. 2, a horizontal axis represents time and a vertical axis represents voice power. In the example illustrated in FIG. 2, a symbol P denotes input power and a symbol Pn denotes power of background noise. In the example illustrated in FIG. 2, the input power P does not exceed the sum of the background noise power Pn and the threshold value α until time t1, and thus during this period the background noise power Pn is updated to the input power P repeatedly. When time t1 is reached, the input power P exceeds the sum of the background noise power Pn and the threshold value α. In response, the first speech period detection unit 12a stores time t1 as the start position of the speech period in the internal memory. Thereafter, the input power P remains greater than or equal to the sum of the background noise power Pn and the threshold value α until time t2, and thus determination as to the end position of the speech period is not performed in this period. When time t2 is reached, the input power P falls down below sum of the background noise power Pn and the threshold value α. In response, time t2 is determined as the end position of the speech period, and the period from time t1 to time t2 is output as the speech period to the feature value calculation unit 13 which will be described later.

Note that the speech period detection method described above is merely an example, and other methods may be employed. For example, it may be allowed to employ an improved method that provides better detection accuracy in detecting a speech detection, as with a method disclosed, for example, in Japanese Laid-open Patent Publication No. 7-92989 or International Publication Pamphlet No. WO/2009/078093.

The second speech period detection unit 12b is a processing unit that detects a period during which the speaker B is uttering from a voice frame of the speaker B input via the voice input unit 11. The second speech period detection unit 12b performs processing in a similar manner to that performed by the first speech period detection unit 12a described above, and outputs a speech period of the speaker B to the adjustment unit 18 which will be described later.

The feature value calculation unit 13 is a processing unit that calculates a feature value for the voice data of the speaker A detected by the first speech period detection unit 12a. More specifically, for example, the feature value calculation unit 13 analyzes the voice data of the speaker A to calculate MFCC, LPC cepstrum, and power for each voice frame, and dynamic feature values thereof, such as Δ or ΔΔ value, and the feature value calculation unit 13 properly combines them into feature vectors as feature values. Note that MFCC stands for Mel Frequency Cepstrum Coefficient, and LPC for Linear Predictive Coding.

The acoustic model storage unit 14 is a storage unit that stores an acoustic model. As for the acoustic model, for example, data indicating a phoneme and a feature value related thereto may be stored in a correlated manner. Instead of storing a feature value for each phoneme, feature values and corresponding words including a combination of one or more phonemes may be stored in a correlated manner. Note that the first detection unit 17 described later accesses the acoustic model storage unit 14 to check matching with a feature value of a speech period of the speaker A calculated by the feature value calculation unit 13.

The word dictionary storage unit 15 is a storage unit that stores a word dictionary. For example, the word dictionary includes data representing words each related to a reply flag indicating whether a word is a reply. The word dictionary storage unit 15 is accessed by the first detection unit 17 described later to search for a word corresponding to a combination of phonemes obtained by checking matching between a feature value of a speech period of the speaker A and the acoustic model.

The reply probability storage unit 16 is a storage unit that stores a reply probability model. An example of a reply probability model is a probability model representing a relationship between a relative time with respect to a speech period of a speaker B and an occurrence probability that a reply occurs during an utterance of the speaker A. For example, the reply probability storage unit 16 is accessed by the adjustment unit 18 described later to adjust a detection threshold value used by the second detection unit 19 in detecting a word. Note that the probability model is statistical data calculated from a large number of samples, and the speaker A and the speaker B are not necessarily the same persons as the speaker A and the speaker B.

Figure 3:
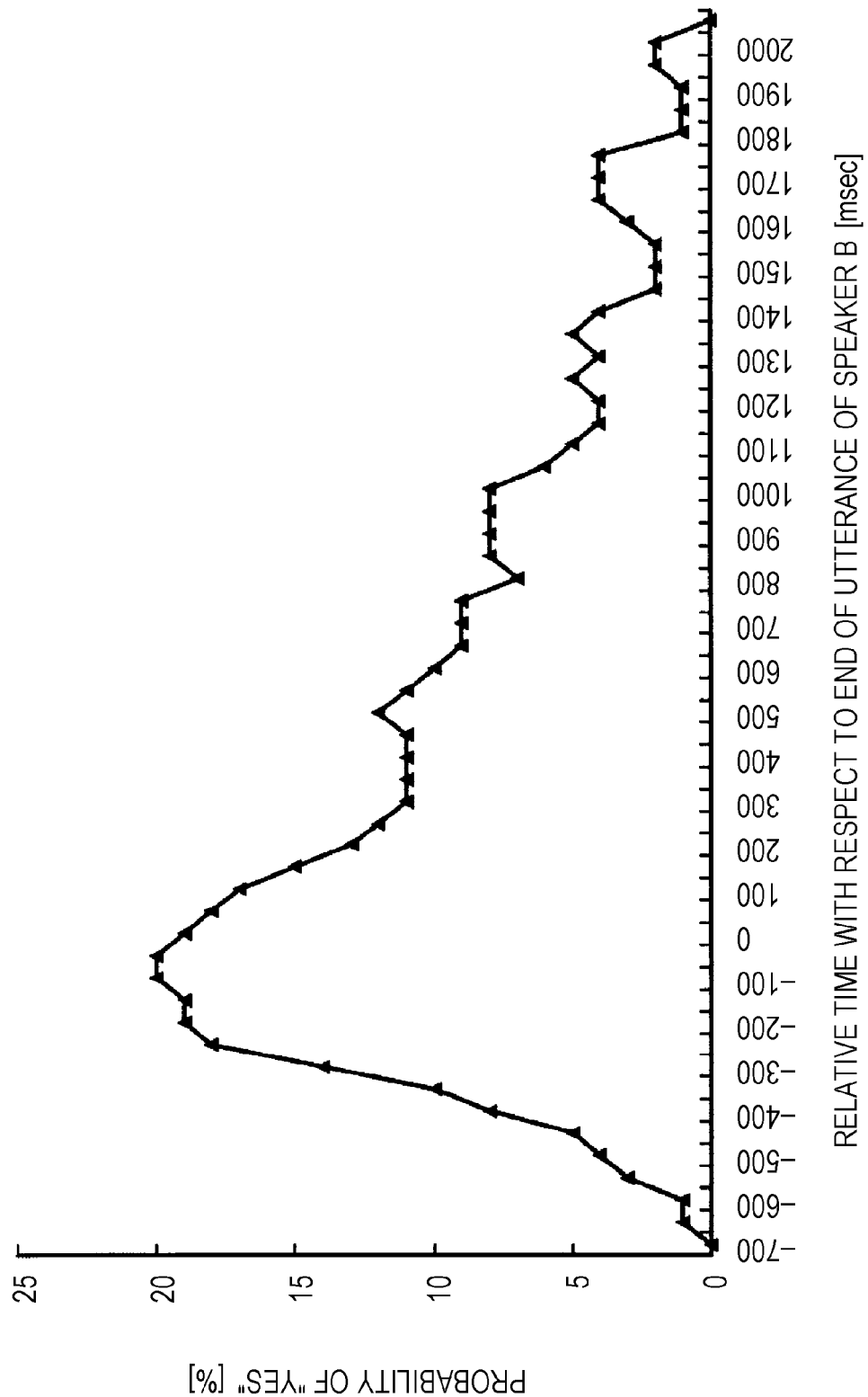
FIG. 3 is a diagram illustrating an example of a reply probability model.

FIG. 3 is a graph illustrating an example of a reply probability model. In this graph illustrated in FIG. 3, a vertical axis represents an occurrence probability of a reply "yes", and a horizontal axis represents a relative time (msec) as measured from a reference point taken at the end position of the speech period of the speaker B. In the example illustrated in FIG. 3, the relative time is divided into intervals each having a particular length such as 50 msec, and the occurrence probability is represented in each interval. In the reply probability model illustrated in FIG. 3, the probability of occurring of a reply in the utterance of the speaker A has a peak of 20% in an interval from 100 msec before to 50 msec before the end of the utterance of the speaker B. In periods before and after this peak interval, the occurrence probability of the reply of the speaker A decreases more steeply in a backward direction from the point 100 msec before the end of the utterance of the speaker B than in a forward direction from the point 50 msec before the end of the utterance of the speaker B.

The occurrence probability of the reply of the speaker A may be calculated by counting the cumulative number of occurrences of the reply "yes" in the voice data in each interval T of the relative time and substituting the counted number into Equation (1) described below. In Equation (1) described below, P(T) denotes the occurrence probability of the reply "yes" in the interval T of the relative time, Y(T) denotes the number of samples of the reply "yes" appearing in the interval T of the relative time, and N(T) denotes the number of samples that are not the reply "yes" in the interval T of the relative time.

$$P(T)=Y(T)/(Y(T)+N(T))\times 100(\%) \qquad (1)$$

The first detection unit 17 is a processing unit that detects a word by using the feature value of the speech period of the speaker A. More specifically, for example, the first detection unit 17 checks matching between the feature value of the speech period of the speaker A calculated by the feature value calculation unit 13 and the acoustic model stored in the acoustic model storage unit 14. The first detection unit 17 then searches the word dictionary stored in the word dictionary storage unit 15 to detect a word corresponding to a combination of phonemes obtained as a result of the matching. Thereafter, the first detection unit 17 calculates a score of the word retrieved from the word dictionary and determines whether the score is greater than or equal to a detection threshold value. In the word detection process, for words registered as replies in the word dictionary, the first detection unit 17 uses a for-reply detection threshold value TH1 smaller than a for-general-word detection threshold value TH0 used in comparing scores of general words other than replies. In a case where the score of the word is greater than or equal to the detection threshold value TH0 or the detection threshold value TH1, the first detection unit 17 outputs a detection result indicating the detected period in which the word was detected and the score of the word to the second detection unit 19 described later. In this process, when the detected word is a reply, the first detection unit 17 outputs the detected period in which the reply was detected also to the adjustment unit 18 described later.

By setting the for-reply detection threshold value TH1 to be lower than the for-general-word detection threshold value TH0 as described above, it becomes possible to detect every word that may be a reply included in the voice data of the speaker A. The detection result provided by the first detection unit 17 is subjected later to a re-detection process performed by the second detection unit 19, and thus the detection result is allowed to include an incorrectly detected word such as noise or a word which is similar to that of the correct word but which is different in meaning.

The score of the word is calculated, for example, within a range from 0 to 100, such that the greater the score the better in matching between the feature value and the acoustic model. For example, in the case of "yes", an acoustic model of phonemes /Y/, /EH/ and /S/ is compared with the feature value of the speech period of the speaker A. If the matching is high, i.e., the acoustic model is close to the input feature value, a high score close to 100 is given in the calculation. In this case, because only words having scores greater than or equal to the detection threshold value, increasing the detection threshold value toward 100 results in a reduction in the number of words detected. Conversely, reducing the detection threshold value results in an increase in the number of words detected.

Note that the word score may be calculated based on the output probability of the acoustic model, which is a probability model. More specifically, for example, likelihood or logarithmic likelihood, or a distance from a template of an acoustic model may be used in the calculation of the word score. In the case of the distance from the template, the closer to zero the distance is, the better the matching between the feature value and the acoustic model. Conversely, the greater the distance, the greater the difference between the feature value and the acoustic model. Thus, the relationship between the threshold value and the easiness of detecting words is inverse to the previous example described above.

The adjustment unit 18 is a processing unit that adjusts a re-detection threshold value THw used by the second detection unit 19 described later. More specifically, for example, when a word of a reply is detected by the first detection unit 17, the adjustment unit 18 detects a speech period of the speaker B that is located before and closest to a start position of the period of the detected reply. The adjustment unit 18 then calculates a relative position of the reply of the speaker A as measured from a reference point taken at the end position of the detected speech period of the speaker B. Thereafter, the adjustment unit 18 searches the reply probability model stored in the reply probability storage unit 16 to retrieve occurrence probability in intervals of the relative time corresponding to the relative position of the reply of the speaker A, and the adjustment unit 18 employs the average of the retrieved occurrence probability as the occurrence probability of the reply of the speaker A. Thereafter, depending on the occurrence probability of the reply of the speaker A, used by the second detection unit 19 described below.

Figure 4:
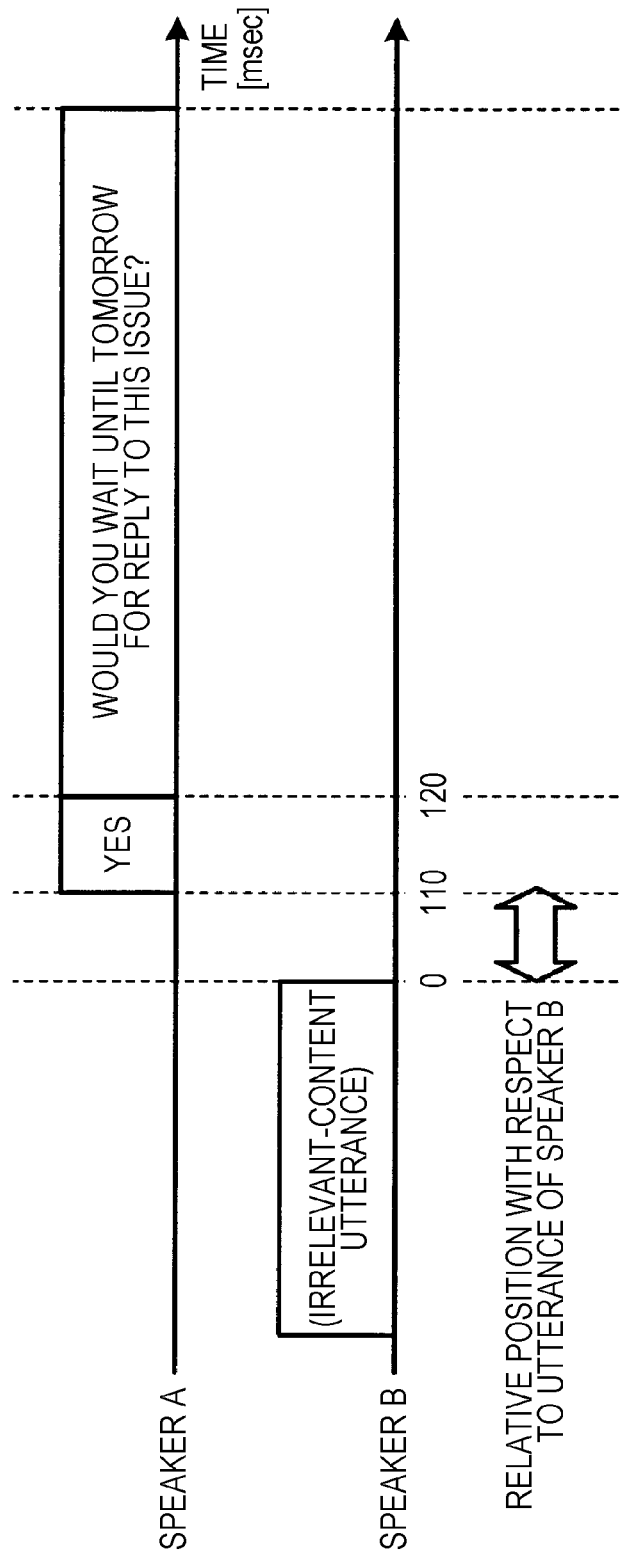
FIG. 4 is a diagram illustrating an example of a relative position between an utterance of a speaker B and a reply of a speaker A.
Figure 5:
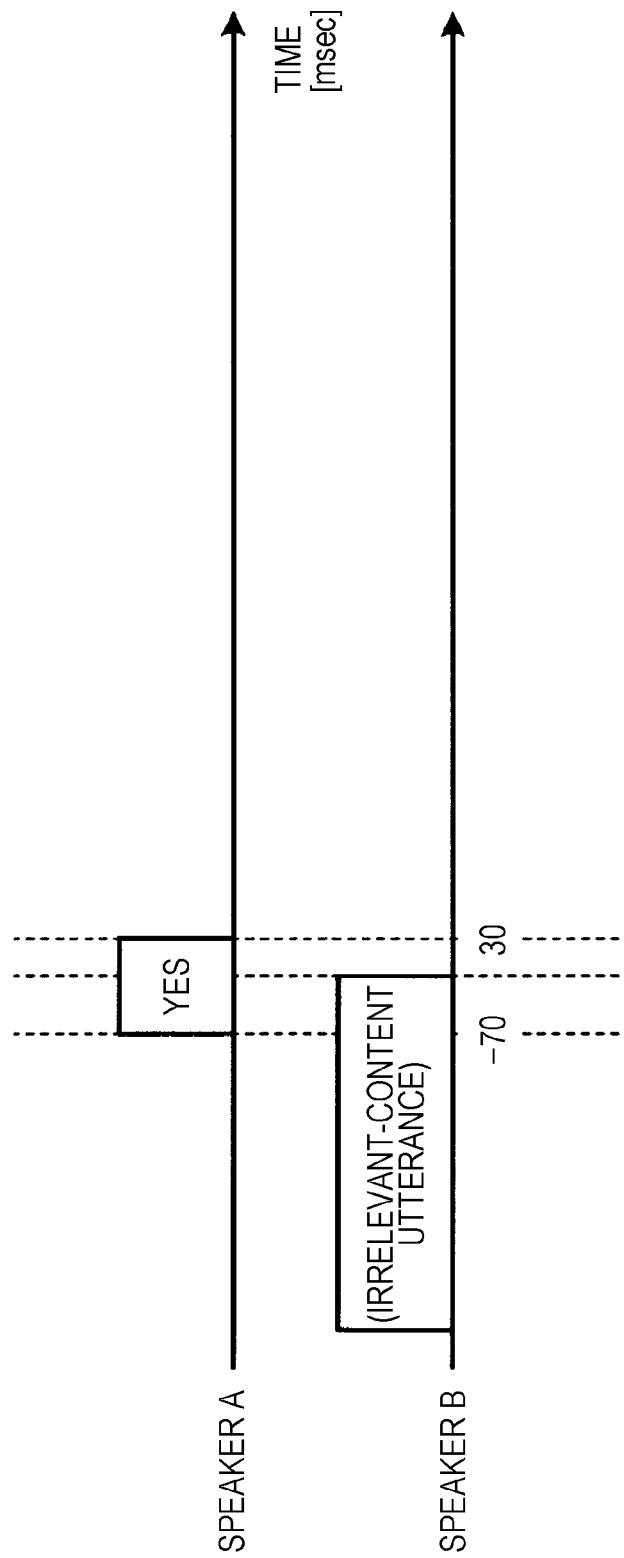
FIG. 5 is a diagram illustrating an example of a relative position between an utterance of a speaker B and a reply of a speaker A.

FIG. 4 and FIG. 5 illustrate examples of relative positions between the utterance by the speaker B and the reply by the speaker A. In the example illustrated in FIG. 4, the period of a reply "yes" of the speaker A starts 110 msec after the end point of the preceding speech period of the speaker B and ends 210 msec after the end point. Thus, the adjustment unit 18 determines the period from 110 msec to 210 msec as the relative position of the speaker A. In the example illustrated in FIG. 5, there is an overlap between the end point of a speech period of the speaker B and a period of a reply "yes" of the speaker A. In this case, the relative position of the reply "yes" of the speaker A starts 70 msec before the end position of the speech period of the speaker B and ends 30 msec after the end position of the speech period of the speaker B. Thus the adjustment unit 18 determines the period from −70 msec to 30 msec as the relative position of the speaker A.

In the case where the relative position of the reply of the speaker A is from 110 msec to 210 msec as in the example illustrated in FIG. 4, the adjustment unit 18 reads an occurrence probability at 150 msec and that at 200 msec from the reply probability model because the occurrence probability is described in units of 50 msec in the example illustrated in FIG. 3. The adjustment unit 18 then calculates the average of the occurrence probability of 15% at the relative time of 150 msec and the occurrence probability of 13% at the relative time of 200 msec thereby determining the occurrence probability Pa of the reply of the speaker A as 14%. Although in this example, the occurrence probability is determined by calculating the average of occurrence probabilities of periods of relative times corresponding to the relative position of the reply of the speaker A, the occurrence probability of the reply may be calculated in other manners. For example, a maximum or a minimum value of occurrence probability associated with the period of the relative time corresponding to the relative position of the reply of the speaker A may be employed as the occurrence probability Pa of the reply.

Thereafter, the adjustment unit 18 adjusts the re-detection threshold value THw such that the re-detection threshold value THw decreases as the calculated occurrence probability Pa of the reply increases, and the re-detection threshold value THw increases as the calculated occurrence probability Pa of the reply decreases. For example, the adjustment unit 18 adjusts the re-detection threshold value THw such that when the occurrence probability Pa of the reply is equal to a maximum value, the re-detection threshold value THw is reduced down to a value equal to the detection threshold value TH1 used by the first detection unit 17. On the other hand, in a case where the occurrence probability Pa of the reply is lower than or equal to a predetermined reference value A, the adjustment unit 18 increases the re-detection threshold value THw to a predetermined value TH2. When the occurrence probability Pa of the reply is lower than the maximum value or greater than the reference value A, the adjustment unit 18 performs linear mapping between the occurrence probability Pa of the reply and the re-detection threshold value THw such that the re-detection threshold value THw is adjusted to a value within an adjustment range, i.e., such that TH1≤THw≤TH2.

For example, as illustrated in FIG. 3, when the maximum occurrence probability Pmax is 20% and TH1 and TH2 are respectively set to 70 and 80, the adjustment unit 18 calculates the re-detection threshold value THw such that when the occurrence probability Pa of the reply is 14%, these values are substituted into Equation (2) described below, and as a result, the re-detection threshold value THw is given as 73. In this case, when the score of the reply of the speaker A is greater than or equal to 73, the second detection unit 19 described below performs a re-detection operation on the reply.

$$THw = TH2 - P/Pmax*(TH1-TH2) \quad (2)$$

The second detection unit 19 is a processing unit that performs the re-detection, using the re-detection threshold value THw adjusted by the adjustment unit 18, in terms of the reply detected by the first detection unit 17. More specifically, for example, the second detection unit 19 determines whether the score of the reply received from the first detection unit 17 is greater than or equal to the re-detection threshold value THw adjusted by the adjustment unit 18. In a case where the score of the reply is greater than or equal to the re-detection threshold value THw, the second detection unit 19 outputs, as a re-detection result, the detected period of the reply and the score thereof. On the other hand, in a case where the score of the reply is lower than the re-detection threshold value THw, it is estimated that the likelihood of the word being a reply is low although the word was detected as a reply by the first detection unit 17. Therefore, in this case, a re-detection result is not output.

The first speech period detection unit 12a, the second speech period detection unit 12b, the feature value calculation unit 13, the first detection unit 17, the adjustment unit 18, and the second detection unit 19 may be realized using an integrated circuit or an electronic circuit. More specifically, an ASIC (Application Specific Integrated Circuit) is an example of an integrated circuit, and a CPU (Central Processing Unit), and a MPU (Micro Processing Unit) are examples of electronic circuits.

The acoustic model storage unit 14, the word dictionary storage unit 15, and the reply probability storage unit 16 may be realized using a semiconductor memory device or a storage device. More specifically, a VRAM (Video Random Access Memory), a RAM (Random Access Memory), and a flash memory are examples of semiconductor memory devices, and a hard disk and an optical disk are examples of storage devices.

Processing Flow

Next, a flow of processing performed by the speech recognition apparatus according to the present embodiment is described below. In the following description, (1) the speech period detection process performed by the speech recognition apparatus 10 is explained first, and then (2) the speech recognition process is explained.

(1) Speech Period Detection Process

Figure 6:
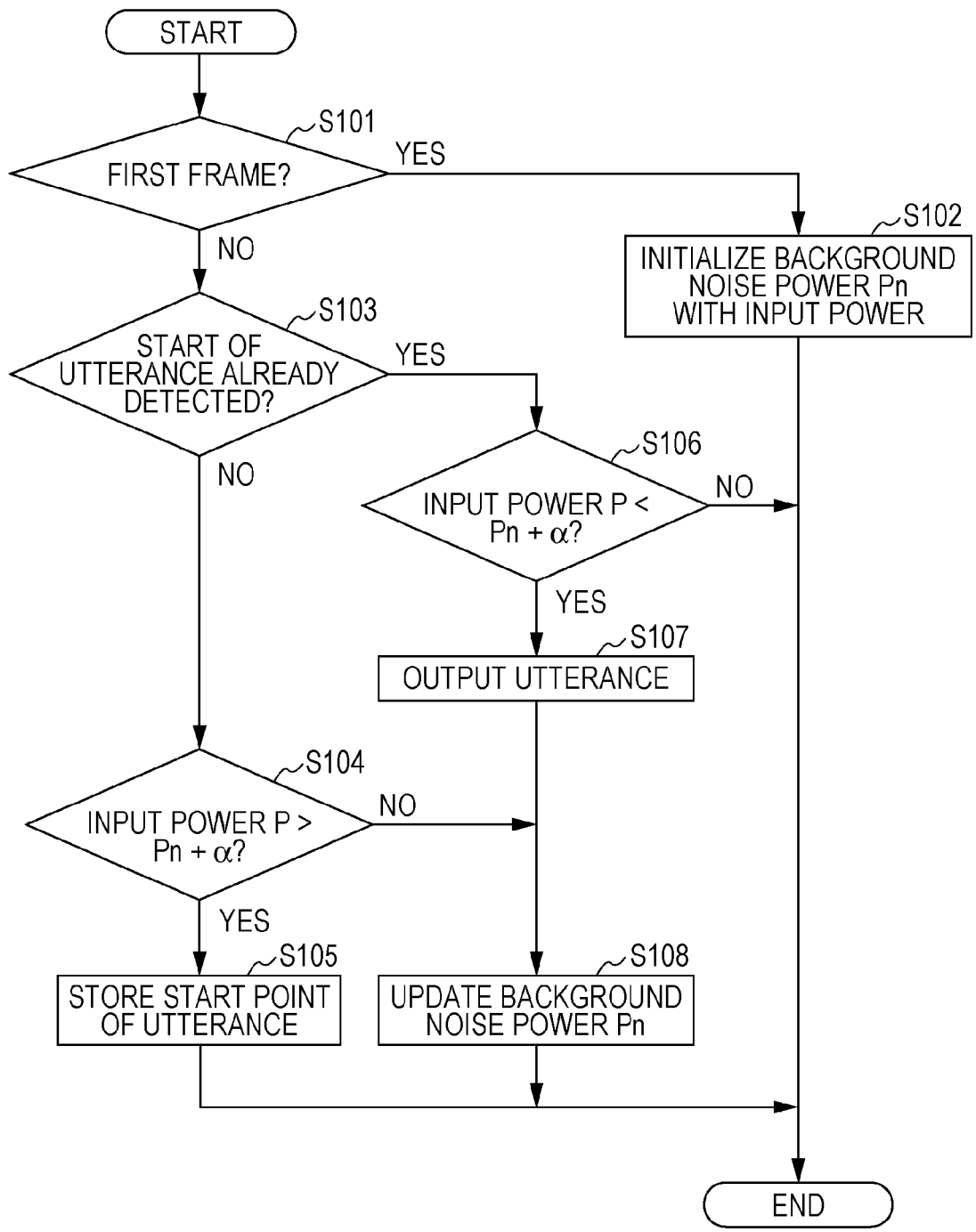
FIG. 6 is a flow chart illustrating a speech period detection process according to the first embodiment.

FIG. 6 is a flow chart illustrating the speech period detection process according to the first embodiment. This speech period detection process is started when a voice frame of the speaker A is input to the first speech period detection unit 12a or when a voice frame of the speaker B is input to the second speech period detection unit 12b. The process performed by the first speech period detection unit 12a is similar to that performed by the second speech period detection unit 12b, and thus, in the following description, the speech period detection process performed by the first speech period detection unit 12a is explained as an example.

As illustrated in FIG. 6, in a case where a voice frame input from the voice input unit 11 is a first frame (i.e., in a case where the answer to step S101 is affirmative), the first speech period detection unit 12a performs initialization by setting the background noise power Pn to be equal to the input power P (step S102), and the process is ended.

On the other hand, in a case where the voice frame input from the voice input unit 11 is not a first frame (i.e., in a case where the answer to step S101 is negative), the first speech period detection unit 12a determines whether starting of a speech period has been detected (step S103).

In a case where starting of a speech period has not been detected (i.e., in a case where the answer to step S103 is negative), the first speech period detection unit 12a further performs a determination as follows. That is, the first speech period detection unit 12a determines whether the input power P of this voice frame is greater than the sum of the background noise power Pn and a threshold value α, i.e., whether P>Pn+α (step S104).

In a case where the input power P of the voice frame is greater than the sum of the background noise power Pn and a threshold value α (i.e., in a case where the answer to step S104 is affirmative), it is estimated that the speaker A is uttering, and the first speech period detection unit 12a stores, in an internal memory (not illustrates), a time at which the above-described sum was exceeded as a start position of the speech period (step S105). The process is then ended.

On the other hand, in a case where the input power P of the voice frame is smaller than the sum of the background noise power Pn and a threshold value α (i.e., in a case where the answer to step S104 is negative), the first speech period detection unit 12a performs a process as described below. That is, the first speech period detection unit 12a updates the value of the background noise power Pn stored in the internal memory (not illustrated) to the input power P (step S108), and the process is ended.

In a case where starting of a speech period has been detected (i.e., in a case where the answer to step S103 is affirmative), the first speech period detection unit 12a further performs a determination as described below. That is, the first speech period detection unit 12a determines whether the input power P of the voice frame has become smaller than the sum of the background noise power Pn and the threshold value α, i.e., P<Pn+α (step S106).

In a case where the input power P of the voice frame has become smaller than the sum of the background noise power Pn and the threshold value α (i.e., in a case where the answer to step S106 is affirmative), it is assumed that the utterance of the speaker A is ended. Thus, the first speech period detection unit 12a regards that the speech period ended at a time instant at which the input power P of the voice frame fell down below the sum of the background noise power Pn and the threshold value α, and the first speech period detection unit 12a outputs a period from the start position stored in the internal memory to the detected end position as a speech period of the speaker A (step S107). Thereafter, the first speech period detection unit 12a updates the background noise power Pn stored in the not-illustrated internal memory to a value equal to the input power P (step S108), and the process is ended.

On the other hand, in a case where the input power P of the voice frame is greater than or equal to the sum of the background noise power Pn and the threshold value α (i.e., in a case whether the answer to step S106 is negative), the utterance of the speaker A is regarded as continuing. In this case, the first speech period detection unit 12a postpones the determination as to the end position of the speech period, and ends the process.

(2) Speech Recognition Process

Figure 7:
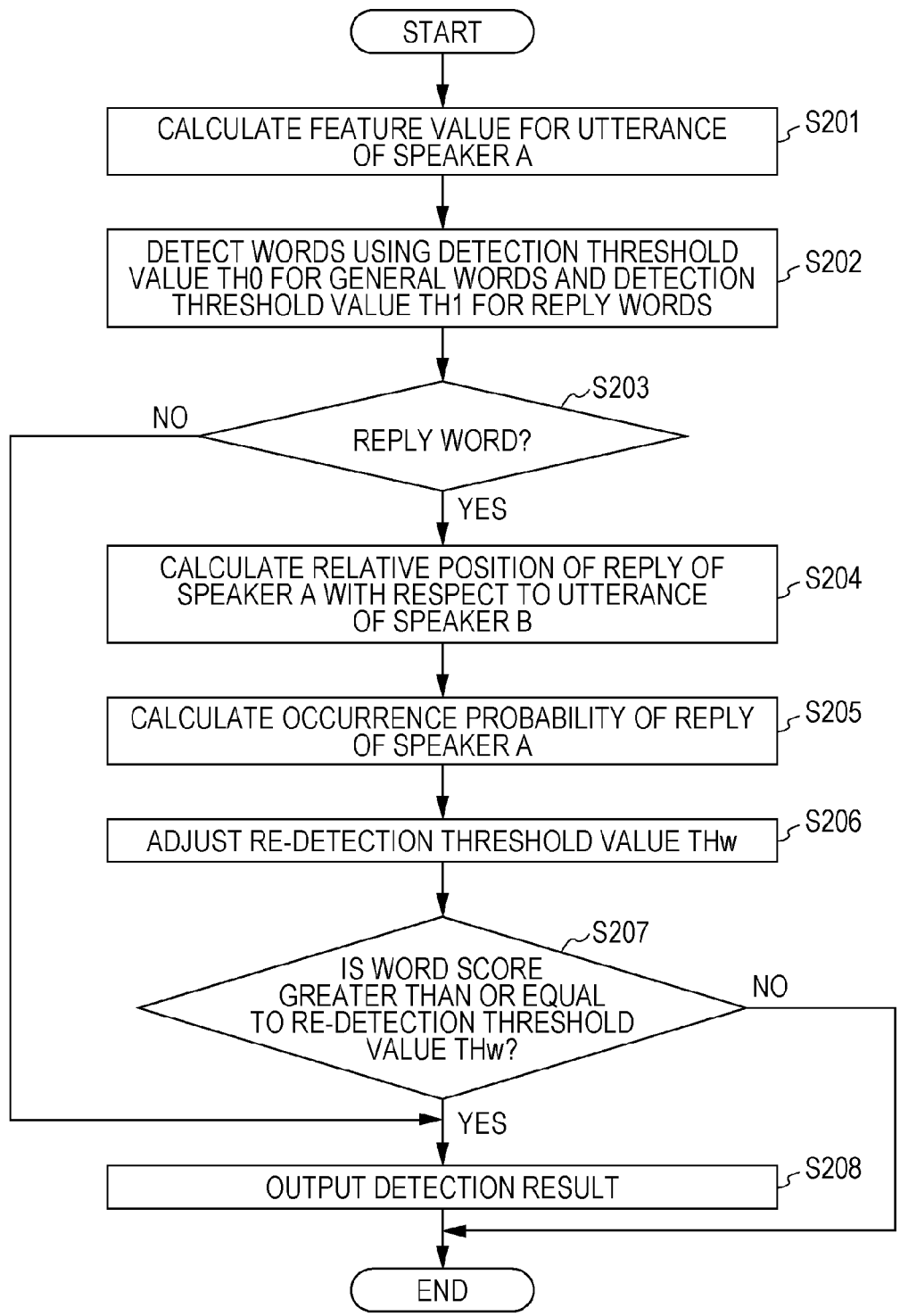
FIG. 7 is a flow chart illustrating a speech recognition process according to the first embodiment.

FIG. 7 is a flow chart illustrating a speech recognition process according to the first embodiment. This process is started when the first speech period detection unit 12a detects a speech period of the speaker A.

As illustrated in FIG. 7, first, the feature value calculation unit 13 calculates a feature value for voice data of the speaker A detected by the first speech period detection unit 12a (step S201). Subsequently, the first detection unit 17 performs a word detection process using the for-general-word detection threshold value TH0 and the for-reply detection threshold value TH1 (step S202).

In this process, in a case where a word detected by the first detection unit 17 is not a reply (i.e., in a case where the answer to step S203 is negative), the second detection unit 19 outputs a detection result indicating a detected period in which the word was detected and a score of the word (step S208), and the process is ended.

On the other hand, in a case where the word detected by the first detection unit 17 is a reply (i.e., in a case where the answer to step S203 is affirmative), the adjustment unit 18 performs a process as described below. That is, based on the detected period of the reply, the adjustment unit 18 calculates a relative position of the reply of the speaker A with respect to a reference point taken at the end position of the immediately previous speech period of the speaker B (step S204).

Subsequently, the adjustment unit 18 searches the reply probability model stored in the reply probability storage unit 16 to retrieve occurrence probabilities in intervals of the relative time corresponding to the relative position of the reply of the speaker A, and the adjustment unit 18 employs the average of the retrieved occurrence probabilities as the occurrence probability of the reply of the speaker A (step S205). Depending on the occurrence probability of the reply of the speaker A, the adjustment unit 18 adjusts the re-detection threshold value THw used by the second detection unit 19 (step S206).

Thereafter, the second detection unit 19 determines whether the score of the reply received from the first detection unit 17 is greater than or equal to the re-detection threshold value THw adjusted by the adjustment unit 18 (step S207).

In a case where the score of the reply is greater than or equal to the re-detection threshold value THw (i.e., in a case where the answer to step S207 is affirmative), the second detection unit 19 outputs the detected period of the reply and the score thereof as a re-detection result (step S208), and the process is ended.

On the other hand, in a case where the score of the reply is lower than the re-detection threshold value THw (i.e., in a case where the answer to step S207 is negative), it is estimated that the likelihood of the word being a reply is low although the word was detected as a reply by the first detection unit 17. Thus, in this case, the process is ended without outputting a re-detection result.

Advantageous Effects of First Embodiment

As described above, the speech recognition apparatus 10 according to the present embodiment detects a speech period of the speaker A from a voice of the speaker A and also detects a speech period of the speaker B from a voice of the speaker B. Furthermore, the speech recognition apparatus 10 according to the present embodiment calculates a feature value of the speech period of the speaker A and performs a word detection process using the feature value of the speech period of the speaker A. In a case where the detected word is a reply, the speech recognition apparatus 10 according to the present embodiment checks the reply probability model to detect an occurrence probability corresponding to the relative position of the reply with respect to the speech period of the speaker B, and the speech recognition apparatus 10 adjusts the detection threshold value associated with the reply depending on the detected occurrence probability. Furthermore, the speech recognition apparatus 10 according to the present embodiment performs a word re-detection process using the adjusted detection threshold value associated with the reply.

Thus, in the speech recognition apparatus 10 according to the present embodiment, when a reply of the speaker A is detected, it is possible to adjust the detection threshold value associated with a word depending on whether the relative position of the reply of the speaker A with respect to the speech period of the speaker B is at a position where the reply occurrence probability is high or at a position where the reply occurrence probability is low. Therefore, in the speech recognition apparatus 10 according to the present embodiment, it is possible to adjust the detection threshold value such that a reply is easily detected only in a situation in which the reply is highly likely to be uttered. Furthermore, in the speech recognition apparatus 10 according to the present embodiment, the calculation of a feature value and a word detection process may not be performed for a speech of the speaker B. Therefore, in the speech recognition apparatus 10 according to the present embodiment, it is possible to increase the detection accuracy of a reply to an utterance of a speaker with a reduced processing load on the speech recognition process.

Furthermore, in the speech recognition apparatus 10 according to the present embodiment, the re-detection threshold value THw is adjusted such that the re-detection threshold value THw associated with a reply is reduced with increasing occurrence probability Pa of the reply. Thus, in the speech recognition apparatus 10 according to the present embodiment, it is possible to reduce the re-detection threshold value THw associated with a reply in a situation in which the reply is highly likely to be uttered. Therefore, in the speech recognition apparatus 10 according to the present embodiment, even in a case where a reply has a small amount of input information compared with other utterances, it is possible to effectively use the small amount of information, which results in an increase in detection accuracy of the reply.

Furthermore, in the speech recognition apparatus 10 according to the present embodiment, when an occurrence probability Pa of a reply is at a maximum value, the re-detection threshold value THw of the reply is adjusted to be equal to the detection threshold value TH1 used in detecting the word. Thus, in the speech recognition apparatus 10 according to the present embodiment, when a reply is very likely to be uttered, the re-detection threshold value THw for the reply is set to be as low as possible. Therefore, in the speech recognition apparatus 10 according to the present embodiment, even in a case where a reply has a small amount of input information compared with other utterances, it is possible to use the small amount of information as effectively as possible, which results in an increase in detection accuracy of the reply.

Furthermore, in the speech recognition apparatus 10 according to the present embodiment, the re-detection threshold value THw is adjusted such that the re-detection threshold value THw associated with a reply is increased with decreasing occurrence probability Pa of the reply. Thus, in the speech recognition apparatus 10 according to the present embodiment, it is possible to increase the re-detection threshold value THw associated with a reply in a situation in which the reply is likely not to be uttered. Therefore, the speech recognition apparatus 10 according to the present embodiment is capable of inhibiting a word, which has the same pronunciation as a reply but which is used in a different meaning from the reply, from being erroneously detected as the reply.

FIG. 8 and FIG. 9 are diagrams illustrating advantageous effects of the first embodiment. In FIG. 8 and FIG. 9, results of recognition performed on actual voice data are compared between the present embodiment and the conventional technique. In the examples illustrated in FIG. 8 and FIG. 9, it is assumed that only the reply "yes" is registered as a detection word in the word dictionary, and the occurrence probability of "yes" is the same as that illustrated in FIG. 3.

In the example illustrated in FIG. 8, the reference detection threshold value is set to 80 in the conventional technique, and the detection threshold value is reduced to 78 and 77 to make it possible to detect "yes" more easily. Results thereof are compared with results obtained by the present embodiment in which threshold values are set such that TH1=75 and TH2=80 (the detection threshold value is in a range from 75 to 80), and TH1=70 and TH2=80 (the detection threshold value is in a range from 70 to 80). That is, in the present embodiment, the detection threshold value is adjusted to make it possible to detect "yes" more easily only in a situation in which "yes" is very likely to occur. The results of the conventional technique indicate that if the detection threshold value is changed with the intention of increasing the number of correct detection to 540 or more, the number of incorrect detection increases to 9, and thus the correct detection ratio decreases. In comparison between the conventional technique and the present embodiment for the case where the number of incorrect detection is 6 or 8, the number of correct detection is greater in the present embodiment than in the conventional technique.

In the example illustrated in FIG. 9, results are compared between a case in which the detection threshold value is increased from a standard value 80 to 81 to reduce the probability incorrect detection for "yes" in the conventional technique and a case in which threshold values are set such that TH1=75 and TH2=81 (the detection threshold value is in a range from 75 to 81) in the present embodiment. In the present embodiment, in addition to setting the threshold values to make it possible to detect "yes" more easily only in a situation in which "yes" is likely to occur, the threshold values are set such that "yes" is not easily detected in a situation in which "yes" is not likely to occur. The experimental results indicate that unlike the conventional technique, the present embodiment allows it to reduce the number of incorrect detections to 5 without resulting in a reduction in the number of correct detections, which means that the present embodiment provides advantageous effects.

By increasing the threshold values at relative positions where the reply "yes" is not likely to occur in the above-described manner, it becomes possible to reduce the probability of detecting "yes" used not as a reply to be detected incorrectly as a reply. For example, an expression "Yes, it is now time." tends to be uttered at a relative position rather far away from a previous utterance of a speaker, and thus the probability value thereof tends to be low. Thus, the probability is low that "Yes" of "Yes, it is now time" is detected as a reply. Thus, the experimental results indicate that the present embodiment provides advantageous effects.

Second Embodiment

Configuration of Model Generation Apparatus

Figure 10:
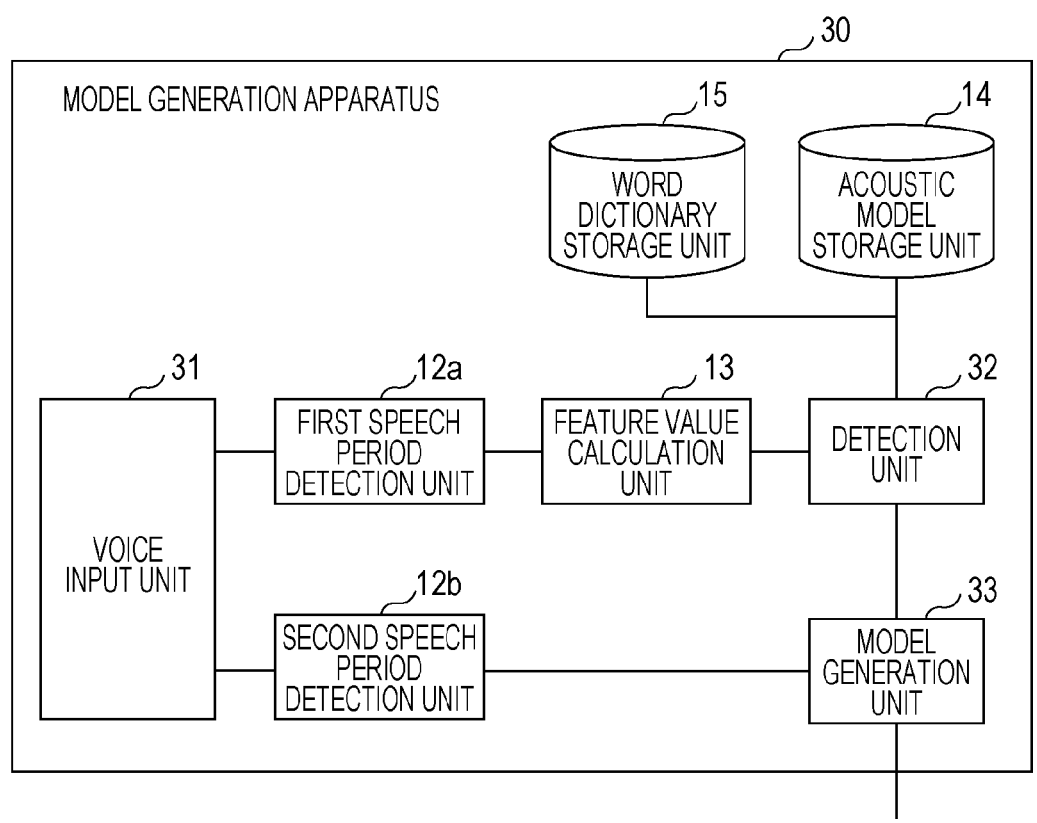
FIG. 10 is a block diagram illustrating a functional configuration of a model generation apparatus according to a second embodiment.

Next, in a second embodiment described below, a model generation apparatus is disclosed which generates a reply probability model used in the first embodiment described above. FIG. 10 is a block diagram illustrating a functional configuration of the model generation apparatus according to the second embodiment. The model generation apparatus 30 illustrated in FIG. 10 is different from the speech recognition apparatus 10 illustrated in FIG. 1 in that it has a voice input unit 31, a detection unit 32, and a model generation unit 33. In FIG. 10, functional units providing similar functions to those in speech recognition apparatus 10 illustrated in FIG. 1 are denoted by similar reference numerals, and a further description thereof is omitted.

A voice input unit 31 is a processing unit configured to input voice data to a first speech period detection unit 12a and a second speech period detection unit 12b. Unlike the voice input unit 11 illustrated in FIG. 1, the voice input unit 31 inputs voice data acquired in a clean environment to the first speech period detection unit 12a and the second speech period detection unit 12b. Herein, an example of a clean environment is an indoor environment in which there is less noise than in an outdoor environment. A more desirable example is a soundproof room in an indoor environment. To suppress a detection error rate, it is desirable that the voice input unit 31 provides as large an amount of voice data as possible to the first speech period detection unit 12a and the second speech period detection unit 12b.

A detection unit 32 is a processing unit that detects a word by using a feature value of a speech period of a speaker A calculated by a feature value calculation unit 13. More specifically, for example, the detection unit 32 performs a speech recognition process of a reply "yes" based on the feature value of the speech period of the speaker A. In this speech recognition process, as in the first detection unit 17 illustrated in FIG. 1, a known speech recognition technique may be used.

Figure 11:
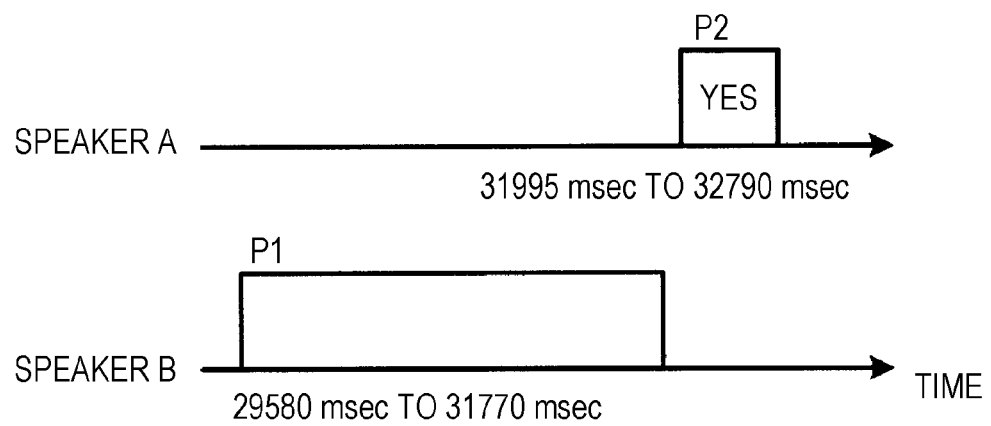
FIG. 11 is a diagram illustrating examples of a labeling result A and a labeling result B.

Hereinafter, a detection result associated with the reply "yes" by the detection unit 32 will also be referred to as a labeling result A, and a detection result associated with the speech period by the second speech period detection unit 12b will also be referred to as a labeling result B. FIG. 11 is a diagram illustrating examples of a labeling result A and a labeling result B. As illustrated in FIG. 11, in the labeling result A, when a reply "yes" is detected, information indicating a detected period thereof is attached to the labeling result A. On the other hand, the labeling result B includes only speech period information.

A model generation unit 33 is a processing unit that generates a reply probability model using the labeling result A and the labeling result B. More specifically, for example, the model generation unit 33 analyzes the labeling result A and the labeling result B, and converts each speech period of the speaker A into a relative position with respect to an immediately previous speech period of the speaker B and counts the number of occurrences of a reply and the number of occurrences of a non-reply for each relative position. More specifically, the model generation unit 33 counts the number of occurrences of the reply and the number of occurrences of the not-reply word for each of intervals with a length of, for example, 50 msec of the relative time.

Figure 12:
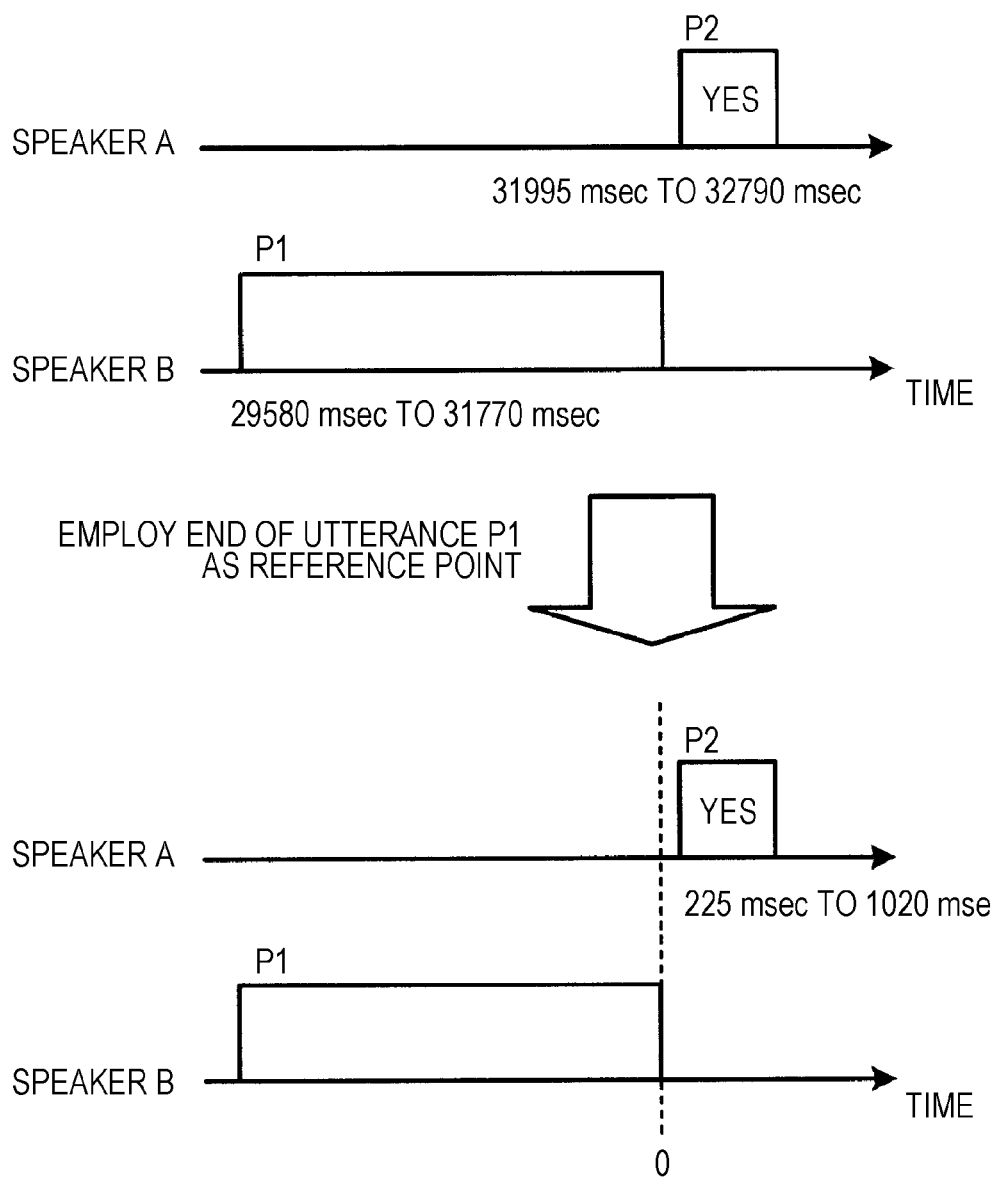
FIG. 12 is a diagram illustrating an example of a method of calculating a relative position of a speech period of a speaker A.

FIG. 12 is a diagram illustrating an example of a method of calculating a relative position of a speech period of the speaker A. As illustrated in FIG. 12, the model generation unit 33 calculates the relative position of the speech period P2 of the speaker A with respect to a reference point taken at 31770 msec which is the end position of the speech period P1 of the speaker B. In this example, the model generation unit 33 subtracts 31770 msec, which is the end position of the speech period P1 of the speaker B, from 31995 msec which is the start position of the speech period P2 of the speaker A, and subtracts 31770 msec, which is the end position of the speech period P1 of the speaker B, from 32790 msec which is the end position of the speech period P2 of the speaker A thereby determining that the relative position of the speech period P2 of the speaker A is 225 msec to 1020 msec. In this calculation, in a case where the relative time is measured in units of 50 msec, the model generation unit 33 counts occurrences of the reply for each interval of 250 msec to 300 msec, 300 msec to 350 msec, . . . , 950 msec to 1000 msec. In a case where the labeling result A is not a reply, the number of occurrences of the not-reply word is counted.

Figure 13:
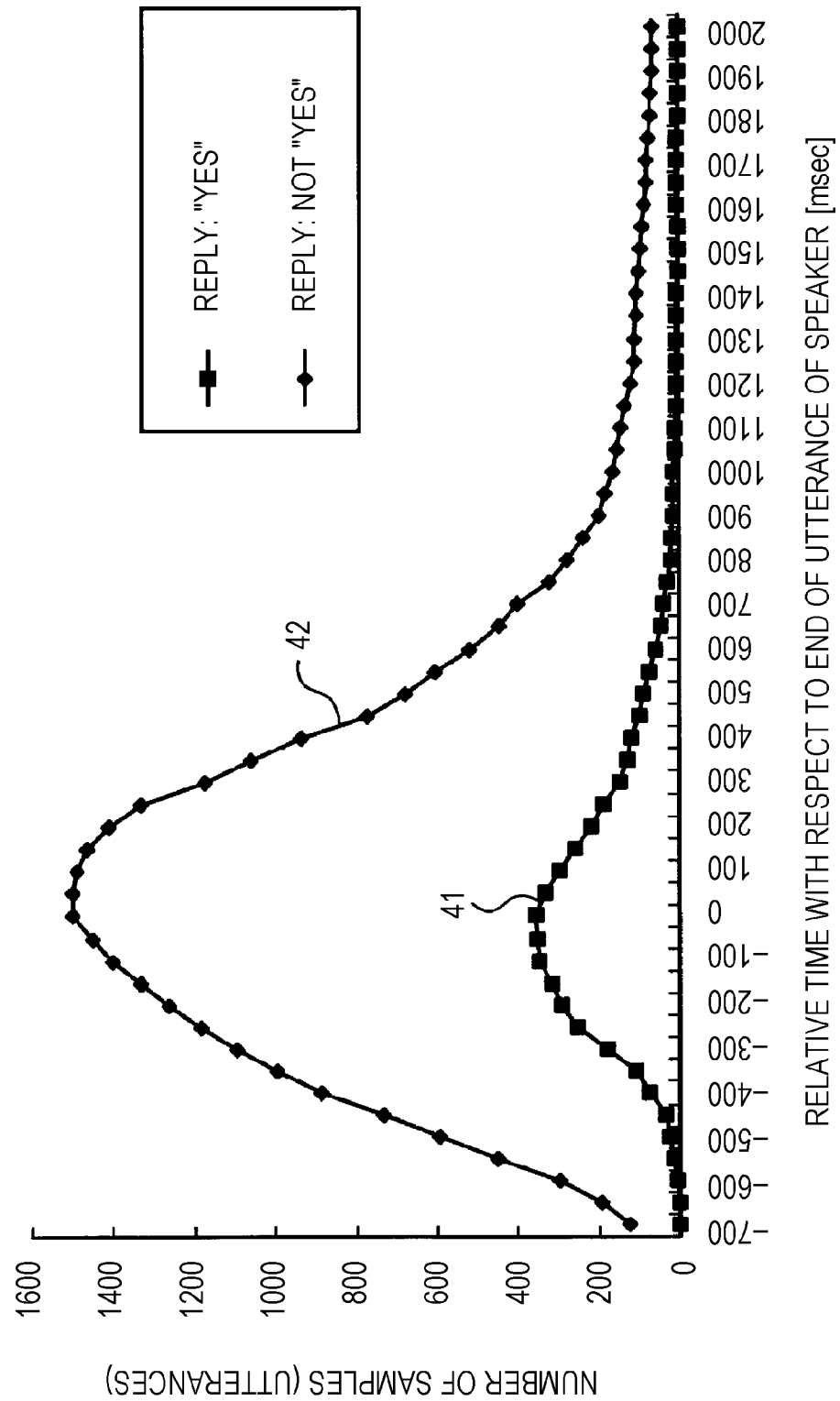
FIG. 13 is a diagram illustrating an example of a distribution of occurrences of a reply word.

FIG. 13 is a diagram illustrating an example of a final result. When the counting is complete for all labeling results, frequency information 41 associated with reply "yes", frequency information 42 associated with words not reply "yes" are separately determined for each period of the relative position as illustrated in FIG. 13. When the probability of "yes" appearing in a period T of the relative position is denoted by P(T), the number of samples of "yes" uttered in the period T of the relative position is denoted by Y(T), and the number of samples in which "yes" is not uttered in the period T of the relative position is denoted by N(T), the occurrence probability of the reply in the period T is given by Equation (3) described below.

$$P(T)=Y(T)/(Y(T)+N(T))\times 100(\%) \quad (3)$$

Processing Flow

Figure 14:
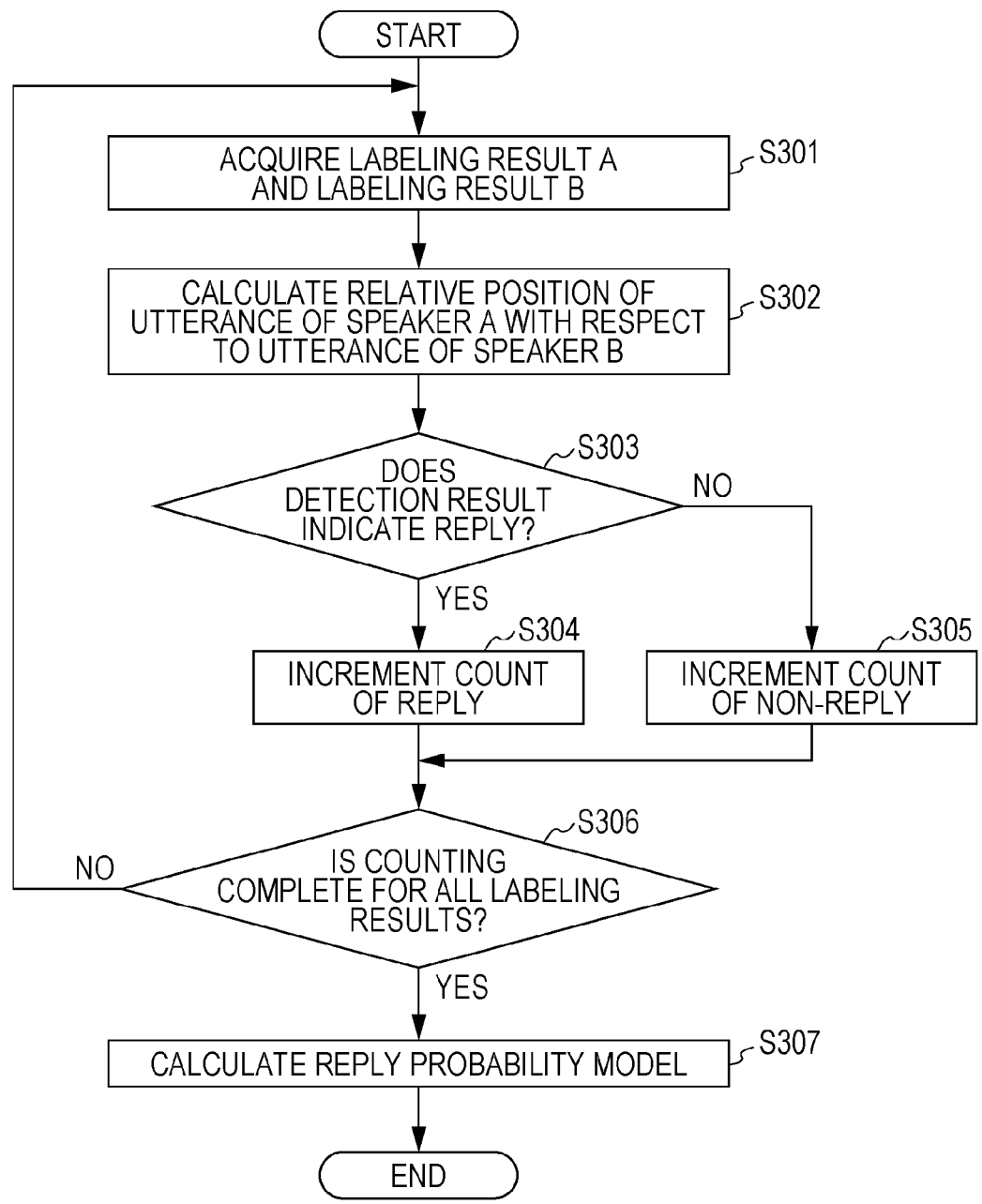
FIG. 14 is a flow chart illustrating a model generation process according to the second embodiment.

FIG. 14 is a flow chart illustrating a model generation process according to the second embodiment. This process is started when a request for generation of a reply probability model is received via a user interface (not illustrated) or an external apparatus (not illustrated).

As illustrated in FIG. 14, first, the model generation unit 33 acquires the labeling result A and the labeling result B (step S301). Subsequently, the model generation unit 33 calculates a relative position of a speech period of the speaker A with respect to a reference point taken at the end position of the speech period of the speaker B (step S302).

In a case where the labeling result A is a reply, (i.e., in a case where the answer to step S303 is affirmative), the model generation unit 33 counts the number of occurrences of the reply for each of relative time intervals corresponding to the relative position of the speech period of the speaker A (step S304).

On the other hand, in a case where the labeling result A is not a reply, (i.e., in a case where the answer to step S303 is negative), the model generation unit 33 counts the number of occurrences of not-reply words for each of relative time intervals corresponding to the relative position of the speech period of the speaker A (step S305). The steps S301 to S305 are performed repeatedly until the counting is complete for all labeling result (i.e., until the answer to step S306 becomes affirmative).

When the counting is complete for all labeling result (i.e., if the answer to step S306 is affirmative), the model generation unit 33 performs a process as described below. That is, the model generation unit 33 substitutes the number of occurrences of the reply counted in each relative time interval and the number of occurrences of not-reply words counted in each relative time interval into Equation (3) described above thereby generating the reply probability model (step S307), and the process is ended.

As described above, in the model generation apparatus 30 according to the present embodiment, it is possible to automatically generate the reply probability model illustrated in FIG. 3 by executing the steps S301 to S307 described above.

As discussed in the first embodiment referring to the experimental results, it is possible to adjust the threshold values so as to increase the correct recognition rate also in a case in which automatic labeling is performed using the speech recognition. Thus, it is possible to reduce the probability that the detection result of the reply "yes" includes noise (incorrect detection), which makes it possible to provide great confidence to the calculated probability of the reply "yes".

In the speech recognition process for labeling, applying the word detection method according to the first embodiment described above leads to an increase in detection accuracy. Therefore, by using the calculated probability value, re-labeling and re-calculation of the probability value may be performed to obtain a probability value with higher confidence.

In the detection process according to the first embodiment described above, labeling results with high SNR (Signal-to-Noise Ratio) values and high word scores may be collected and input as additional input data to the model generation unit 33 thereby updating the probability information. This may make it possible to adapt to differences among users.

Third Embodiment

The first and second embodiments have been described above. In addition to those, there may be other embodiments as described below.

Adjusting Word Score

In the first embodiment described above, the re-detection threshold value THw, which is compared with a score of a word, is adjusted. Alternatively, other parameters may be adjusted. For example, the word score S may be adjusted depending on the occurrence probability Pa.

More specifically, for example, the score of the word calculated by the first detection unit 17 may be adjusted in accordance with a word score adjustment equation Sn=S+P/Pmax*G. In this adjustment equation, G denotes adjustment sensitivity. Alternatively, the word score Sn may be adjusted by clipping it such that Sn≤100 and then the resultant word score Sn may be compared with a for-general-word detection threshold value TH0 to achieve similar advantageous effects to those achieved in the first embodiment. Still alternatively, THw may be adjusted in a stepwise manner, for example, such that when the occurrence probability of the word w is greater than or equal to 20% THw is set to be smaller by −2 than TH0, while when the occurrence probability is greater than or equal to 10%, THw is set be smaller by −2, and so on. Still alternatively, the threshold value THw may be set depending on the interval of the distribution of the occurrence probability of the word w. For example, the relative time of the occurrence probability of the word w may be divided into three intervals, and THw may be set to be −2 relative to TH0 in the central interval, while THw may be set to be −1 in other intervals.

Types of Reply

In the first embodiment described above, the discussion is made for a case in which "yes" is only the reply word. Note that occurrence probabilities may be calculated for other reply words such as "no", "yeah", etc., and a similar process to that according to the first embodiment may be performed. Instead of calculating the occurrence probability for each word, the occurrence probability may be defined for a category of reply, and the process may be performed based on the defined occurrence probability.

Languages

In the first embodiment described above, it is assumed by way of example that the language is English. Note that the embodiments may be applied to many other languages in addition to English as long as the situation is similar, i.e., a first speaker utters a reply in response to a speech of a second speaker. In such a situation, a large difference occurs between a reply and other words in terms of the occurrence probability at relative positions with respect to a speech period of a second speaker, and this difference does not greatly depend on the language, which allows the embodiments to be applied to many other languages. For example, the Japanese languages has expressions of replies corresponding to English expressions "yes", "no", "OK", etc., and these expressions tend to occur at particular relative positions with respect to a speech period of a second speaker, which makes it possible to the embodiments to apply to the Japanese language.

Number of Speakers

In the first embodiment described above, it is assumed by way of example that a conversation is performed between two speakers, i.e., the speaker A and the speaker B. The embodiments may be applied to a case where a conversation is performed by three or more people as long as the situation is similar to that described above in which a speaker utters a reply in response to a speech of another speaker.

Division and Combination of Units

In apparatuses illustrated in figures, physical configurations of constituent elements are not limited to those illustrated in the figures. That is, the manner of distribution and integration of units of the apparatus is not limited to that illustrated in the figures, but all or part of the units may be divided or combined functionally or physically depending on various loads or usage conditions. For example, one or more of the first speech period detection unit 12a, the second speech period detection unit 12b, the feature value calculation unit 13, the first detection unit 17, the adjustment unit 18, and the second detection unit 19 may be disposed outside and may be connected to the speech recognition apparatus via a network. Alternatively, the first speech period detection unit 12a, the second speech period detection unit 12b, the feature value calculation unit 13, the first detection unit 17, the adjustment unit 18, and the second detection unit 19 may be individually or any combination thereof may be disposed in separate apparatuses and may be connected to each other via a network such that they cooperate so as to provide functions of the speech recognition apparatus described above.

Speech Recognition Program

Figure 15:
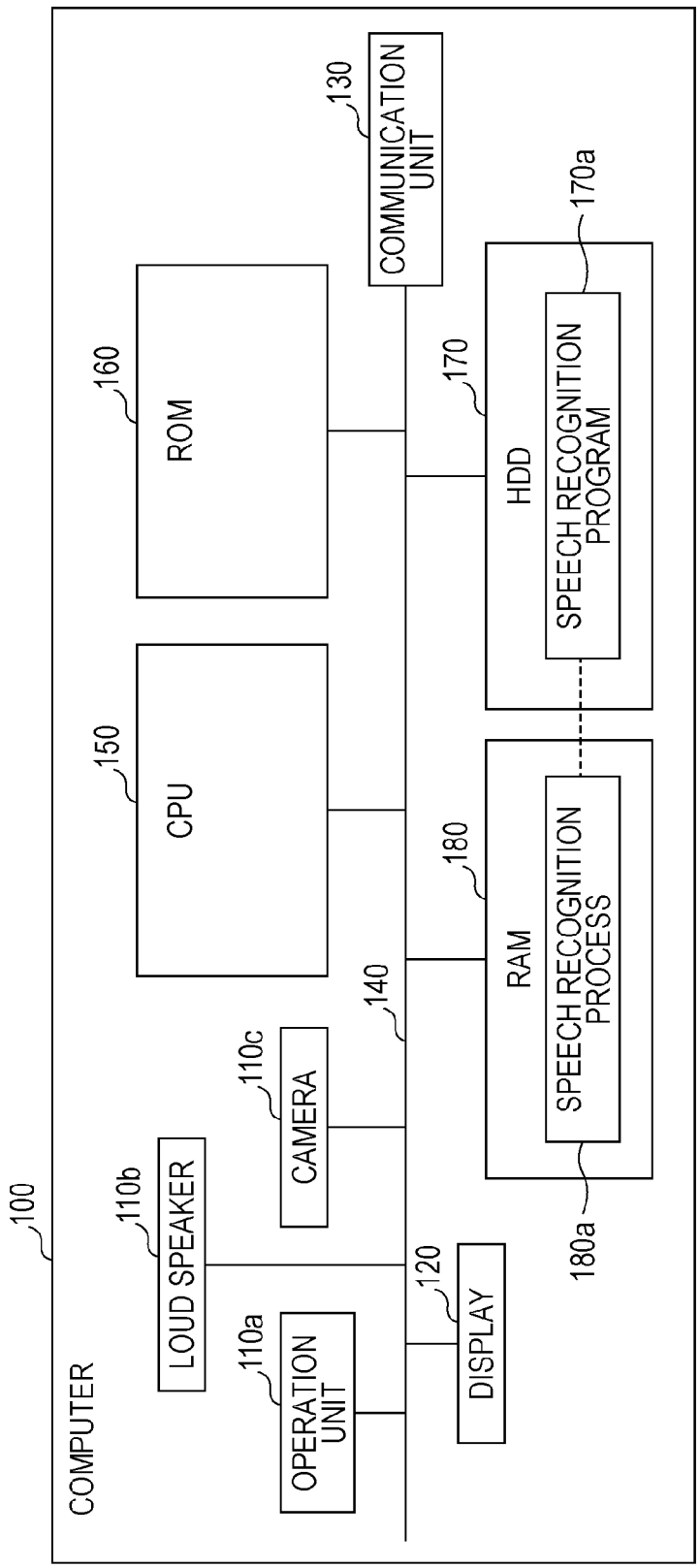
FIG. 15 is diagram illustrating a computer configured to execute a speech recognition program according to a third embodiment.

Processes described above with reference to the embodiments may be performed by executing a program prepared in advance on a computer such as a personal computer, a workstation, or the like. Referring to FIG. 15, a description is given below as to an example of a computer configured to execute a speech recognition program to provide functions similar to those described above with reference to the embodiments.

That is, FIG. 15 illustrates an example of a computer configured to execute a speech recognition program according to a third embodiment. As illustrated in FIG. 15, the computer 100 includes an operation unit 110a, a loud speaker 110b, a camera 110c, a display 120, and a communication unit 130. The computer 100 further includes a CPU 150, a ROM 160, a HDD 170, and a RAM 180. These units 110 to 180 are connected to each other via a bus 140.

As illustrated in FIG. 15, a speech recognition program 170a is stored in advance in the HDD 170, where the speech recognition program 170a provides functions similar to the first speech period detection unit 12a, the second speech period detection unit 12b, the feature value calculation unit 13, the first detection unit 17, the adjustment unit 18, and the second detection unit 19, according to the first embodiment described above. Note that in the speech recognition program 170a, program modules corresponding to the first speech period detection unit 12a, the second speech period detection unit 12b, the feature value calculation unit 13, the first detection unit 17, the adjustment unit 18, and the second detection unit 19 illustrated in FIG. 1 may be combined or divided as appropriate. That is, the HDD 170 does not have to store all data. The HDD 170 may store only data to be used for processing.

The CPU 150 reads the speech recognition program 170a from the HDD 170 and installs the speech recognition program 170a in the RAM 180 such that the speech recognition program 170a functions to perform the speech recognition process 180a as illustrated in FIG. 15. The speech recognition process 180a stores various kinds of data read out from the HDD 170 in allocated storage areas of the RAM 180 and executes various processes based on the data stored in the RAM 180. The speech recognition process 180a includes processes corresponding to processes performed by the first speech period detection unit 12a, the second speech period detection unit 12b, the feature value calculation unit 13, the first detection unit 17, the adjustment unit 18, and the second detection unit 19 illustrated in FIG. 1, and more specifically, for example, the processes illustrated in FIG. 6 and FIG. 7. Note that all processing units virtually realized on the CPU 150 may not operate every time on the CPU 150, but only some processing units may be virtually realized as occasion calls.

The speech recognition program 170a may not exist in the HDD 170 or the ROM 160 from the beginning. For example, all or part of the speech recognition program 170a may be stored on a portable physical medium designed to be inserted into the computer 100, such as a flexible disk (FD), a CD-ROM disk, a DVD disk, a magnetooptical disk, an IC card, etc. The computer 100 may acquire the program from the portable physical medium and many execute the program. Alternatively, all or part of the speech recognition program 170a may be stored in another computer or a server apparatus connected to the computer 100 via a public communication line, the Internet, a LAN, a WAN, or the like such that the computer 100 may acquire the program therefrom.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A speech recognition apparatus comprising:
   a reply probability storage unit configured to store a reply probability model representing a relationship between a relative time defined with respect to a speech period of one speaker and an occurrence probabilities of a reply occurring in an utterance of another different speaker;
   a first speech period detection unit configured to detect an speech period of a first speaker from a voice of the first speaker;
   a second speech period detection unit configured to detect an speech period of a second speaker from a voice of the second speaker different from the first speaker;
   a feature value calculation unit configured to calculate a feature value of the speech period of the first speaker detected by the first speech period detection unit;
   a first detection unit configured to detect a word using the feature value of the speech period of the first speaker calculated by the feature value calculation unit;
   an adjustment unit configured to make an adjustment such that in a case where the word detected by the first detection unit is a reply, the adjustment unit refers to the reply probability model stored in the reply probability storage unit to retrieve an occurrence probability corresponding to a relative position of the reply with respect to the speech period of the second speaker detected by the second speech period detection unit, the adjustment unit adjusts a word score for the reply or a detection threshold value for the reply depending on the retrieved occurrence probability; and
   a second detection unit configured to perform a re-detection using the word score for the reply or the detection threshold value for the reply adjusted by the adjustment unit, in terms of the word detected by the first detection unit.

2. The speech recognition apparatus according to claim 1, wherein the adjustment unit adjusts the detection threshold value for the replies such that the detection threshold value decreases with increasing occurrence probability.

3. The speech recognition apparatus according to claim 1, wherein the adjustment unit adjusts the detection threshold value for the replies such that in a case where the occurrence probability takes a maximum value, the adjustment unit adjusts the detection threshold value so as to be equal to the detection threshold value used by the first detection unit to detect the word.

4. The speech recognition apparatus according to claim 1, wherein the adjustment unit adjusts the detection threshold value for the replies such that the detection threshold value increases with decreasing occurrence probability.

5. A speech recognition method using a computer, said method comprising:
   detecting an speech period of a first speaker from a voice of the first speaker;
   detecting an speech period of a second speaker from a voice of the second speaker different from the first speaker;
   calculating, using the computer, a feature value of the speech period of the first speaker;
   detecting a word by using the calculated feature value of the speech period of the first speaker;
   making an adjustment such that in a case where the detected word is a reply, a reply probability model stored in a reply probability storage unit is searched to retrieve an occurrence probability corresponding to a relative position of the reply with respect to the speech period of the second speaker, and a word score for the reply or a detection threshold value for the reply is adjusted depending on the retrieved occurrence probability; and
   performing a word re-detection using the adjusted word score for the reply or the adjusted detection threshold value for the reply.

6. A non-transitory computer readable storage storing a speech recognition program including instructions to be executed by a computer, the instructions comprising:
   detecting an speech period of a first speaker from a voice of the first speaker;
   detecting an speech period of a second speaker from a voice of the second speaker different from the first speaker;
   calculating, using the computer, a feature value of the speech period of the first speaker;
   detecting a word by using the calculated feature value of the speech period of the first speaker;
   making an adjustment such that in a case where the detected word is a reply, a reply probability model stored in a reply probability storage unit is searched to retrieve an occurrence probability corresponding to a relative position of the reply with respect to the speech period of the second speaker, and a word score for the reply or a detection threshold value for the reply is adjusted depending on the retrieved occurrence probability; and
   performing a word re-detection using the adjusted word score for the reply or the adjusted detection threshold value for the reply.

\* \* \* \* \*